United States Patent [19]

Boutevin et al.

[11] Patent Number: 5,208,312

[45] Date of Patent: May 4, 1993

[54] SILICONES WHICH CONTAIN LATERAL PERIPHERAL VINYL ETHER GROUPS HAVING ALIPHATIC OR AROMATIC URETHANES

[75] Inventors: Bernard J. L. Boutevin, Montpellier; Boulos Youssef, Mont-Saint-Aignan, both of France; Gerardo Caporiccio, Milan, Italy

[73] Assignee: Dow Corning Corporation, Midland, Mich.

[21] Appl. No.: 839,163

[22] Filed: Feb. 21, 1992

[30] Foreign Application Priority Data

Jun. 27, 1991 [FR] France ............... 91 07954

[51] Int. Cl.$^5$ ............................................. C08G 77/04
[52] U.S. Cl. .................................. 528/28; 528/26; 528/29; 528/34; 528/30; 528/35; 528/42; 528/43; 528/41; 556/420
[58] Field of Search ............. 528/41, 26, 28, 29, 528/34, 30, 35, 42, 43; 556/420

[56] References Cited

U.S. PATENT DOCUMENTS

| | | | |
|---|---|---|---|
| 3,873,499 | 3/1975 | Michael | 260/46.5 E |
| 4,064,027 | 12/1977 | Gant | 204/159.13 |
| 4,387,206 | 6/1983 | Bayer | 528/28 |
| 4,605,712 | 8/1986 | Mueller | 525/474 |
| 4,617,238 | 10/1986 | Crivello | 428/452 |
| 4,640,940 | 2/1987 | Jacobine | 522/99 |
| 4,695,603 | 9/1987 | Inoue | 524/723 |
| 4,822,850 | 4/1989 | Yashuda | 528/28 |
| 4,849,461 | 7/1989 | Lee | 522/33 |
| 4,909,935 | 3/1990 | Bradshaw | 210/198.2 |
| 5,057,550 | 10/1991 | Lutz | 522/148 |

FOREIGN PATENT DOCUMENTS

| | | |
|---|---|---|
| 222582 | 5/1987 | European Pat. Off. |
| 4009889 | 6/1991 | Fed. Rep. of Germany |
| 1569681 | 6/1980 | United Kingdom |

Primary Examiner—Melvyn I. Marquis
Attorney, Agent, or Firm—Alex Weitz

[57] ABSTRACT

The invention relates to copolymers of siloxanes with the formula:

$$(R_a)_3SiO(V)_v—(W)_w—(Y)_y—(Z)_z—Si(R_a)_3$$

where
$V = SiR_aR_bO—$;
$W = SiR'_a(R_c—R_d—OCH=CH_2)O—$;
$Y = SiR_aR_gO—$;
$Z = R_aR_gSiC_nH_{2n}R'_fC_nH_{2n}SiR_aR_gO—$ where $n = 2, 3$ or 4;
v, y, z = 0 or an integer, $w \neq 0$ with $v+y+z \neq 0$;
$R_a$ = alkyl or phenyl; $R_b = R_a$; $R'_a = R_a$ or alkoxy;
$R_c$ = alkylene, for example:
$R_d = —OCONHR_eNHCO—$, $—NH—COOC_2H_4—$, or $—NHCOOC_3H_6—$;
$R_e$ = divalent hydrocarbon radicals; $R_g$, $R_f$ and $R'_f$ are fluorinated or perfluorinated radicals.

The above copolymers are used for the preparation of antiadhesive coatings, for example on paper.

6 Claims, No Drawings

SILICONES WHICH CONTAIN LATERAL PERIPHERAL VINYL ETHER GROUPS HAVING ALIPHATIC OR AROMATIC URETHANES

The invention relates to copolymers which contain siloxane units which are crosslinkable as a result of the action of a photosensitive cationic catalyst such as salts of sulfonium or iodonium. These siloxane units contain a lateral peripheral vinyl ether group connected by a bridge group to a silicon atom, this bridge group having the structure of an aliphatic or aromatic urethane. The substituent groups on the siloxane, which carries peripheral vinyl ether, have the structure of trimethylene urethane-2-ethyl vinyl ether, trimethylene-m-toluenediurethane vinyl ether or 3-thia-1,5-pentanediyl-m-toluenediurethane vinyl ether, as nonlimiting examples.

The vinyl ether group unit alternates along the polysiloxane chain with dimethylsiloxane or methylphenylsiloxane or alkylfluoralkylsiloxane units, or tetraalkyl-alpha,omega-fluoroalkylenedisilaoxane units, or polymer sequences thereof. Said fluoroalkyl or alpha,omega-fluoralkylene group can be obtained by telomerization of tetrafluoroethylene. The proposed silicones can be, for example, crosslinked in the presence or absence of air by conventional irradiation using a mercury vapor lamp or in the presence of salts of sulfonium or iodonium, such as hexafluoroantimonate of triphenylsulfonium. The films of crosslinked polymers are characterized by hydrophobic-oleophobic properties and by antiadhesive properties as well as by good heat resistance and they are useful as protecting insulation layers or as antiadhesive products for paper.

These properties are particularly pronounced when the structure contains fluoroalkyl or fluoroalkylene groups. The antiadhesive property with respect to strong adhesive ribbons is particularly effective at high temperature.

The copolymers of the invention have a molecular weight from 5,000 to 100,000, preferably from 5,000 to 50,000, and they have formula I:

$(R_a)_3SiO(V)_v-(W)_w-(Y)_y-(Z)_z-Si(R_a)_3$   I where
$V = -SiR_aR_bO-$;
$W = -SiR'_a(R_c-R_d-OCH=CH_2)O-$;
$Y = SiR_aR_gO-$;
$Z = -R_aR_gSiC_nH_{2n}R'_fC_nH_{2n}SiR_aR_gO-$ with n=2, 3 or 4;
v, y, z are identical or different numbers, which can however not be zero simultaneously; w is always different from zero; and the ratio of v+y+z/w is between 1 and 100; the $R_a$ groups represent, independently of each other, a radical selected from the group consisting of $CH_3$, $C_2H_5$, n—$C_3H_7$, n—$C_4H_{10}$ radicals, and phenyl, with not more than one phenyl radical being attached to a given silicon atom;
$R_b = R_a$;
$R'_a = R_a$, —$OCH_3$ or $OC_2H_5$
$R_c = -C_2H_4-$, —$C_3H_6-$, —$C_2H_4-S-C_2H_4-$, or —$C_3H_6-S-C_2H_4-$;
$R_d = -OCONHR_eNHCO-$, —NH—$COOC_2H_4-$, or —$NHCOOC_3H_6-$;
$R_3 = -C_6H_3(CH_3)-$, —$C_6H_4CH_2C_6H_4-$, —$(CH_2)_6-$, —$C_6H_{10}-CH_2-C_6H_{10}-$, or —$CH_2-[(CH_3)_3C_6H_7]-$;
$R_g = -C_kH_{2k}-R_f$ where k=2, 3 or 4;

$R_f$ is a perfluoroalkyl group with 1 to 12 carbon atoms such as —$CF_3$, —$C_2F_5$, —$C_3F_7$, —$C_4F_9$, —$C_6F_{13}$, or —$C_8F_{17}$, where the higher perfluoralkyl groups can be formed by telomerization of tetrafluoroethylene (TFE), or a monovalent radical of an aligomer of fluorated oxetanes or oxiranes; $R'_f$ is a perfluoroalkylene group containing from 4 to 10 carbon atoms such as —$C_4F_8-$, —$C_6F_{12}-$ or $C_8F_{16}-$, or an alpha,omega-fluoralkenyl group formed by the telomerization of tetrafluoroethylene or a divalent telochelating radical of an oligomer derived from fluorinated oxetanes or oxiranes, or a m-phenylenedi(hexafluoroisopropoxy) radical; the units V, W, Y and Z can be arranged randomly, in order, or alternated along the polymer chain.

Of the claimed structures, the siloxane units V are obtained by methods which are well known to an expert in the field of commercial silanes. The siloxane units W are obtained, as nonlimiting examples, either by condensation of 3-acetoxypropylmethyldicholorosilane with units of the disilanol type and/or hydrolysis of the acetoxy group and condensation of the hydroxyl group released with alpha,omega-monoisocyanato-m-tolylurethane-ethylene-2-vinyl ether (pathways a, b).

$OCN-R_e-NCO + HOC_2H_4OCH=CH_2 \longrightarrow$   (a1)

$OCNR_eNHCOOC_2H_4OCH=CH_2$

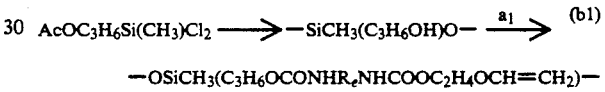
$AcOC_3H_6Si(CH_3)Cl_2 \longrightarrow -SiCH_3(C_3H_6OH)O- \xrightarrow{a1}$   (b1)

$-OSiCH_3(C_3H_6OCONHR_eNHCOOC_2H_4OCH=CH_2)-$ where $R_e$ has the above-mentioned structure, said reaction of diisocyanates with hydroxyl groups is catalyzed by dilauryldibutyltin at a temperature of 50° to 60° C.; or by addition of 2-thioethanol to sequences of methylvinylsiloxane, catalyzed by a free radical initiator such as azobisisobutyronitrile at 70° C. (pathway c).

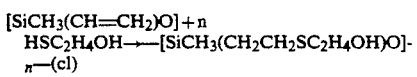
$[SiCH_3(CH=CH_2)O]+n$
$HSC_2H_4OH \rightarrow [SiCH_3(CH_2CH_2SC_2H_4OH)O]-n-$   (c1)

The sequences (cl) are then reacted with alpha,omega-monoisocyanatourethane-ethyl vinyl ether (a1)

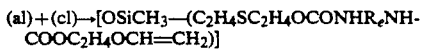
$(a1)+(cl)\rightarrow[OSiCH_3-(C_2H_4SC_2H_4OCONHR_eNHCOOC_2H_4OCH=CH_2)]$ or by reacting 3-isocyanatopropyltriethoxysilane with 2-hydroxyethyl vinyl ether (pathway e).

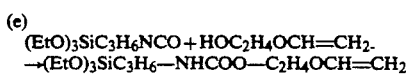
(e)
$(EtO)_3SiC_3H_6NCO+HOC_2H_4OCH=CH_2$
$\rightarrow(EtO)_3SiC_3H_6-NHCOO-C_2H_4OCH=CH_2$ The fluorinated organosilicon reaction compounds having the formulas $X_2R^1_2Si$  II or $XR^2_2Si(R^3SiR^2_2)_xX$  III are intermediate compounds for the siloxane units of the invention corresponding to Y and Z, where X represents a reactive group selected from the group consisting of halogens, preferably chlorine, the hydroxyl, alkoxy, acetoxy, amino, alkylamino and dialkylamino groups, z has values from 1 to 5 inclusively, at least one radical $R^1$ with formula II and at least one of the radicals $R^2$ connected to each one of the silicon atoms of formula III is selected from the group:

1) The fluoroalkyl groups with formula $-C_KH_{2k}R_f$ where $R_f$ is a perfluoroalkyl group with from 1 to 12 carbon atoms, such as $-CF_3$, $-C_2F_5$, $-C_3F_7$ or $-C_4F_9$, where the higher perfluoroalkyl groups can be obtained by telomerization of tetrafluoroethylene, and k=2, 3 or 4.

2) The radicals of monovalent oligomers of fluorinated oxetanes and oxiranes, said radicals being attached to the silicon by a group which contains a nonhalogenated ethylene radical or a nonhalogenated trimethylene radical; all of the possible other radicals $R^1$ and $R^2$ are selected from the group consisting of alkyl radicals with 1 to 4 carbon atoms, alkenyl radicals, perfluoroalkyldimethylene, -trimethylene or -tetramethylene, phenyl or phenyl substituted by a perfluoralkyl group, with the perfluoralkyl fragment of said radicals being substituted by a perfluoralkyl group which contains from 1 to 4 carbon atoms; and $R^3$ is a divalent radical with the formula $-C_kH_{2k}-R'_f-C_kH_{2k}-$ where $R'_f$ contains a radical $-(C_2F_4)-_n-$ obtained by telomerization of tetrafluoroethylene, or a divalent radical derived from oligomers of fluorinated oxetanes or fluorinated oxiranes, or it is a metaphenylenedi(hexafluoroisopropoxy) radical.

The oligomer radicals represented by $R^1$ and $R^2$ have the formulas:

$R_f'O(C_3F_6O)_mCF(CF_3)CA_2OC_3H_6-$,

$C_3F_7O(C_3H_2F_4O)_m-CH_2CF_2CA_2OC_3H_6-$, or

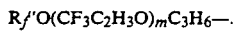

$R_f'O(CF_3C_2H_3O)_mC_3H_6-$.

In the preceding formulas, "A" represents hydrogen or fluorine, and $R_f'$ is $-CF_3$, $-C_2F_5$ or $-C_3F_7$; all the possible radicals $R^1$ and $R^2$ which do not represent a fluoroalkyl radical or a TFE telomer or an oligomer radical as defined above each represent preferably a methyl radical, 3,3,3-trifluoropropyl, phenyl or phenyl substituted by a perfluoroalkyl group, where said perfluoralkyl group contains from 1 to 3 carbon atoms.

$R^3$ is selected preferably from the group consisting of

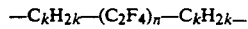

$-C_kH_{2k}-(C_2F_4)_n-C_kH_{2k}-$ $-C_3H_6O(CF_3)_2C-C_6H_4-C(CF_3)_2OC_3H_6-$,

$-C_3H_6OCA_2CF_2CH_2O(C_3H_2F_4O)_gT'O(C_3H_2F_4O)_g-CH_2CF_2CA_2OC_3H_6-$,

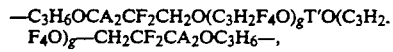

$-C_3H_6OCH_2CF_2O(C_2F_4O)_H(CF_2O)_fCF_2CH_2OC_3H_6-$ or

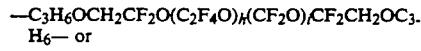

$-C_3H_6OCA_2-CF(CF_3)O(C_3F_6O)_gT'O(C_3F_6O)_g-CF(CF_3)CA_2OC_3H_6-$.

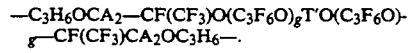

T' is selected from the group consisting of $-C_2F_4-$, $-C_4F_8-$, $-C_5F_{10}-$ and $-(C_2F_4)_2O-$;

the recurrent units are arranged randomly or in succession along the chain;

the value of k is 2, 3, 4;

the value of n is from 2 to 20 inclusively, preferably from 2 to 10;

the value of m is from 1 to 20 inclusively, preferably from 1 to 10;

the value of g is from 1 to 20 inclusively, preferably from 2 to 10; and the value of h/i is from 0.5 to 20 inclusively, and the value of h+i is from 8 to 100 inclusively, preferably from 8 to 20.

The different recurrent fluorinated organosilicon units are arranged randomly or in sequence in the molecules and the silicon atoms of these units are connected by a nonhalogenated linear alkylene radical which contains 2, 3 or 4 carbon atoms with fluoralkyl groups $R_f$, or by a bivalent group which contains a nonhalogenated dimethylene radicals or halogenated trimethylene with the divalent group $R^3$ defined above. One of the radicals $R^1$ present in formula II and one of the terminal radicals $R^2$ located on each of the silicon atoms in formula III can represent alkyl, alkenyl, aryl radicals, phenyl substituted with a perfluoralkyl group and/or monovalent fluorinated alkyl groups corresponding to the formula $-C_kH_{2k}R^4$, where k is 2, 3, 4, and $R^4$ is a perfluoralkyl radical containing from 1 to 4 carbon atoms. $R^3$ can be a telomer or a divalent oligomer as defined above or it can be $-[(CH_2)_3OC(CF_3)_2]_2Ph$, where Ph stands for the m-phenylene radical.

The polysiloxane chain (I) is obtained by hydrolysis or cohydrolysis or polymerization by condensation of silane intermediates of the types:

$X_2SiR_aR_b$

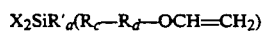

$X_2SiR'_a(R_c-R_d-OCH=CH_2)$

$X_2SiR_aR_g$

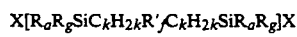

$X[R_aR_gSiC_kH_{2k}R'_fC_kH_{2k}SiR_aR_g]X$

$X-Si(R_a)_3$ where X represents a reactive group selected from halogens, preferably chlorine, the hydroxyl, alkoxy, acetoxy, amino, alkylamino and dialkylamino groups, and K=2, 4 or 4.

DETAILED DESCRIPTION OF PREFERRED EMBODIMENTS

The polyorganosiloxanes prepared using the present organosilicon compounds as at least a part of the organosilicon reactants have a high thermochemical resistance and low surface energy values, which are particularly improved when their structure contains fluorinated groups.

Telomers of Tetrafluoroethylene

One class of the radicals attached to silicon according to the invention is prepared from fluorinated telomers of tetrafluoroethylene.

A preferred method for the preparation of telomers of TFE consists of a radical telomerization of TFE.

The telomerization of TFE can be initiated by telogens substituted with bromine or iodine, represented by the formula $R_fX$ or $XR'_fX$, where $R_f$ and $R'_f$ are as defined above in the present description, and X is bromine or iodine. These telogens belong to a class which includes, without being limited to, $CF_3I$, $C_2F_5I$, n- or iso-$C_3F_7I$, n-$C_4F_9I$, $C_2F_5Br$, $CF_3CFBrCF_2Br$, $CF_2Br_2$, $CF_2ICF_2I$, $I(C_2F_4)_nI$ (n=2 to 10).

The telomers prepared from monobrominated or monoiodated telogens above are attached to a silicon atom by nonhalogenated alkylene radicals containing 2, 3, 4 carbon atoms, and using the methods described in the following paragraphs, to prepare the siloxanes represented by formula I.

The telogens which contain two reactive halogen atoms, iodine or bromine, produce alpha,omega-telochelating telomers which can be attached to two different silicon atoms by means of nonhalogenated linear alkylene radicals with 2, 3, 4 carbon atoms to produce fluorinated polysiloxane. To obtain the linear structure and the absence of extensive crosslinking which characterize the present organosilicon compounds, the synthesis must be organized appropriately with regard to the subsequent series of reactions of appropriate silanes with telochelating dihalotelomers and with monoiodo- and/or monobromotelomers, or with the other compounds described here.

The process of telomerization of TFE initiated by said telogens according to the present invention can be activated by heat or gamma irradiation, or ultraviolet irradiation, of initiators of the organic peroxide type or of redox systems. Preferred catalysts for these reactions are benzoyl peroxide, di-t-butyl peroxide, t-butyl peroxypivalate, and percarbonates.

The reaction can be conducted in the presence of organic solvents including, without being limited to, 1,1,2-trichlorotrifluorethane, t-butyl alcohol, acetonitrile and mixtures thereof. Catalysts such as redox systems with persulfate can also be included, and the telomerization can be carried out in an aqueous dispersion.

The telomerization temperature is between room temperature and 150° C., if the process is activated by irradiation or by catalysts, or between 150° C. and 220° C. if the process is activated thermally.

The pressure at which the reaction is conducted can range from atmospheric pressure to approximately 100 atmospheres, and one should take care to exclude oxygen from the telomerization reaction.

The fluorinated telomers are then attached to the silicon atoms of the present compounds through the intermediary of an alkylene radical without halogen consisting of 2, 3, or 4 carbon atoms, such as the dimethylene or trimethylene or tetramethylene radicals, according to a chain termination process which is carried out appropriately. Ethylene is a reactant which can be used easily in the chain termination reaction.

When they are correctly attached to the silicon as described above, the telomer chain imparts to the final fluorinated organosilicon compound high levels of chemical and thermal resistance and of antiadhesive properties.

Oligomers of Cyclic Fluorinated Ethers (Oxetanes and Oxiranes)

Intermediate oligomer fluorinated polyoxaalkylenes according to the present invention can be prepared using well known methods for the oligomerization of polyfluorooxiranes or fluorooxetanes such as perfluoropropene oxide, 2,2,3,3-tetrafluorooxetane and 3,3,3-trifluoropropene oxide. Some of these oligomers are available commercially.

According to a preferred method, the preferred oligomer polyoxaalkylenes are prepared by reacting cesium fluoride or potassium fluoride with perfluorinated carbonyl compounds such as hexafluoroacetone, trifluoroacetyl fluoride, perfluoropropionyl fluoride, carbonyl fluoride, perfluorosuccinyl or 1,5-oxaperfluoroglutaryl fluorides which can initiate the oligomerization of perfluorooxiranes and fluorooxitanes according to a known method.

The perfluorinated polyoxaalkylenecarbonyl fluoride must be reacted to form appropriate intermediate compounds which can be attached to the silicon. A preferred method consists of stoichiometric addition of potassium and subsequent substitution with allyl bromide to produce oligomer fluorinated polyoxaalkylenes terminated by allyl groups, which are then made to react with a reactive organohydrosilane.

Another pathway to attach the present oligomer fluorinated polyoxaalkylenes to the silicon atom is the metathesis of the fluoride groups of carbonyl acid terminals of these oligomers to methyl esters followed by a reduction to methanol radicals, followed by terminal capping with allyl bromide using the known Williamson synthesis.

Reaction of Fluorinated Telomers and Fluorinated Oligomers to Form Reactive Fluorinated Organosilicon Compounds Fluorinated telomers which are terminated by one or two $(XC_kH_{2k})$—where X is bromine or iodine can be converted to an organometallic derivative such as a Grignard reagent, a copper Grignard reagent, an organic lithium, zinc, or aluminum compound, and they can then be reacted with the silane which contains at least one halogen such as fluorine, chlorine or bromine, and at least one alcoholate group. The organometallic compound can be prepared beforehand or it can be formed in the presence of the silane.

As a variant, the alpha-iodo or alpha-bromo terminal group of the telomer fluoroalkane terminated by a polymethylene group, or the analog of the telechelic alpha,omega-diiodo- or- dibromo-or -bromoiodopolymethylenepolyfluoroalkane which may be dehydrohalogenated to present, respectively, one or two terminal vinyl groups which can be reacted in a hydrosilylation reaction with silanes which contain at least one hydrogen atom connected to the silicon atom. The reaction is catalyzed by organic peroxides and platinum catalysts.

In the case of silanes with formula II, in addition to two atoms or groups required to react with the above-mentioned derivatives of fluorinated telomers and oligomers or other groups, the silanes, after the reaction with the telomers and monofunctional oligomers or with other groups, contain two reactive entities "X" as in formula II which can then be made to react with other silanes to form the sequence of polysiloxane. These two reactive entities include, without being limited to, halogens such as chlorine, alkoxy groups containing 1 to 4, or more than 4 carbon atoms, the hydroxyl group and primary or secondary amino groups.

In the case of formula III, the silanes which are reacted with bifunctional derivatives of telomers or oligomers, or with other groups, and with the monofunctional derivatives of telomers or oligomers or with other groups, require one of the above-mentioned reactive entities on each of the two telochelating silicon atoms present at the end of the molecule represented by formula III. These reactive entities X can then be reacted with other silanes to form an alongated chain structure as mentioned above and represented by formula I.

The units V, W, Y, Z which have the structures represented in formula I can be homopolycondensed appropriately separately to form a homogenous or copolycondensed sequence with statistical sequences according to the useful techniques in silicon chemistry which are well known to the expert in the field.

The crosslinking of said copolymer silicones of formula I which contain a lateral peripheral vinyl ether group is carried out by activation with UV light in the presence of cationic photoinitiators selected from the group of salts of halonium or sulfonium or phosphonium, with the preferred photoinitiators being of the triarylsulfonium hexafluouroantimonate type.

One of the techniques proposed in the invention follows pathways (a) and (b). The intermediate 2-hydroxyethyl vinyl ether is prepared from 2-chloroethyl vinyl ether (Aldrich) using a phase-transfer reaction with sodium acetate, and hydrolysis under mild conditions with KCN. The monoisocyanato-m-tolylurethaneethylene-2-vinyl ether intermediate (1) is prepared by condensation of tolyl diisocyanate and 2-hydroxyethyl vinyl ether as described in European Patent Application No. 0 398 775, filed Nov. 22, 1990. Next, (1) is reacted with a polysiloxane having the structure (2):

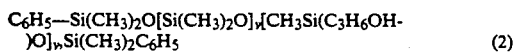

(2)

to yield the product (3) which contains the peripheral vinyl ether group with the following formula:

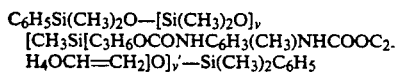

Product (3) is then applied in the form of a film onto paper and crosslinked in the presence of triarylsulfonium hexafluoroantimonate to obtain an antiadhesive coating on the paper.

According to a variant of the same general technique, triethoxysilane-3-propylurethane-2-ethyl vinyl ether (prepared by condensation catalyzed by dibutyl tin dilaurate of 2-hydroxyethyl vinyl ether with 3-isocyanatopropyltriethoxysilane) was subjected to polycondensation with a polydimethylsiloxanediol in the presence of dimethylphenylchlorosilane as chain termination agent. A product (4) with the following structure was obtained:

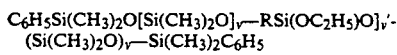

where $R=C_3H_6NHCOOC_2H_4OCH=CH_2$.

After application to paper, this product (4), in the presence of triarylsulfonium salt, was crosslinked by a short exposure to UV light yielding a paper with antiadhesive properties.

According to a different technique, a polymethylvinylsiloxane was reacted with thioethyleneglycol to produce a sil-2-thio-4-hydroxy unit which was reacted with isocyanatotolylurethane-2-ethyl vinyl ether to obtain a silanoxy group with the structure (5).

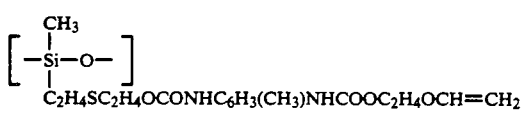

The modified polysiloxane which contains peripheral vinyl ether was activated for crosslinking by UV light in the presence of sulfonium salt.

EXAMPLE 1

Preparation of a Polysiloxane Containing Lateral Urethanevinyl Ether Groups a) Synthesis of hydroxy-2-ethyl vinyl ether a.1) Synthesis of acetoxy-2-ethyl vinyl ether In a 250-mL flask equipped with cooling coil and mechanical stirring system one introduces 50 g of chloro-2-ethyl vinyl ether (Aldrich) (0.47 mol), 39 g sodium acetate (0.47 mol), and 2.2 g TBAH (tetrabutylammonium hydrogen sulfate). The mixture was stirred at 450 rpm for 12 hours at 109° C. It was then filtered, and the solid part (primarily NaCl), was washed several times with ether which was then eliminated by evaporation at reduced pressure; the product was finally distilled (bp$_{20\ mm\ Hg}$=72° C.). The yield obtained was 92%.

With IR (PERKIN ELMER 398): the presence of vibration bands at 1,750 (CO) and 1,620 cm$^{-1}$ (—HC=CH$_2$) was observed.

$^1$H-NMR (250 MHz, CHCl$_3$): the peaks were assigned as follows:

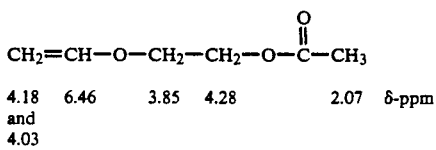

a.2) Hydrolysis of acetoxy-2-ethyl vinyl ether

In a 250-mL flask equipped with cooling coil and magnetic stirring system one introduces: 13 g acetoxy-2-ethyl vinyl ether (0.1 mol), 1.2 g potassium cyanide (0.018 mol), 150 mL methanol RP, and 0.1 g hydroquinone.

The mixture was stirred for 12 hours at 25° C.; it was then treated with ether and filtered over Na$_2$SO$_4$. The solvent was then eliminated at reduced pressure. The product was prepared with a yield of 90%.

$^1$H-NMR (250 MHz, CHCl$_3$): the complete disappearance of the peak at 2.07 ppm

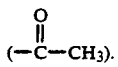

IR: (Perkin-Elmer 398), observation of the complete disappearance of the band at 1,750 cm$^{-1}$ (—C=O) and the appearance of the band at 3,350 cm$^{-1}$ (C—OH).

From this one can conclude that the product obtained had the structure:

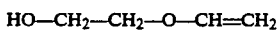

a.3) Synthesis of isocyanatourethane vinyl ether:

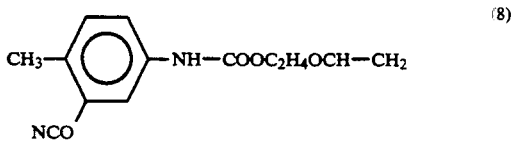

(8)

In a 250-mL flask fitted with nitrogen inlet, tap funnel and a cooling coil, one introduces: 9.88 g TDI (toluene diisocyanate), 100 mL anhydrous toluene, 0.1 DBDLT (dibutyltin dilaurate and 0.1 g hydroquinone. Using a tap funnels one introduces 5 g hydroxy-2-ethyl vinyl ether (7) and 10 mL toluene drop by drop for 30 minutes. The mixture is then heated to 50° C. for 5 hours. At the end of the reaction, toluene and unreacted products are eliminated by evaporation at reduced pressure (yield 98%). The NCO index was 14.2% (by weight).

IR analysis revealed: NCO band to 2,260 cm$^{-1}$
Disappearance of OH band at 3,350 cm$^{-1}$
Presence of —C≡C band at 1,620 cm$^{-1}$ and NH band at 3,320 cm$^{-1}$ $^{13}$C-NMR analysis (BRUKER 80 MHz, CHCl$_3$) permitted the following assignment of peaks:

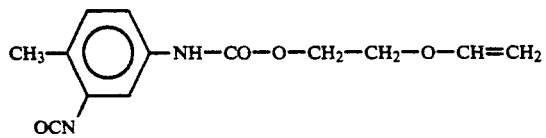

17.4  115.5      154.0  66.1  63.4      151.3  87.4   δ-ppm aromatic ring: in the range between 127 and 136.

a.4) Synthesis of silicone-urethane vinyl ether (10)

In a flask with 2 outlets, fitted with cooling coil and a nitrogen inlet, one introduces: 8.2 g of compound (9) prepared as described below, 12 g anhydrous toluene, 2.72 g of compound (8) and 0.1 g hydroquinone. The mixture was maintained at 60° C. for 6 hours, and then the solvent was eliminated at reduced pressure.

The following product was obtained quantitatively:

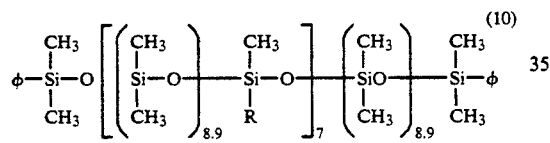

where
R=—C$_3$H$_6$—O—CONH—C$_6$H$_4$(CH$_3$)NH COOC$_2$-H$_4$OCH=CH$_2$ and
φ=—C$_6$H$_5$ IR (Perkin-Elmer 398) results were:
absence of OH vibration bands (3,350 cm$^{-1}$) and NCO vibration band (2,260 cm$^{-1}$).
presence of bands for NH (3,320 cm$^{-1}$) and for vinyl groups (1,620 cm$^{-1}$).

b.1) Synthesis of the compound with formula (9)

In a 500-mL flask fitted with cooling coil one introduces: 100 g α,ω-dihydroxypolydimethylsiloxane (product manufactured by the RHONE-POULENC Company: % OH=5%, $\overline{M}$n=680; n̄=8.9), equivalent to 0.147 mol part; 27.65 g acetoxy-3-propylmethyldichlorosilane (supplied by Petrarch System), equivalent to 0.129 mol part, 6.26 g phenyldimethylchlorosilane (supplied by Petrarch System), equivalent to 0.0368 mol part, 200 mL anhydrous toluene and 4 mL pyridine.

The mixture was heated to 80° C. for 24 hours, then filtered to eliminate the white precipitate and evaporated at reduced pressure to eliminate the solvent (toluene) and unreacted product. A dilution was then carried out with ethyl ether followed by repeated washing to completely eliminate the pyridine salt. The ether phase was dried over Na$_2$SO$_4$, filtered and evaporated at reduced pressure. The product was obtained with a yield of 95%.

This compound was analyzed by IR [spectroscopy] (Perkin-Elmer 398): the complete disappearance of the Si-OH band at 3,360 cm$^{-1}$ was observed, and the appearance of the $$\diagdown_{\diagup} C=O \text{ band at } 1760 \text{ cm}^{-1}.$$

The intrinsic viscosity was measured in butanone at 30° C. (K=0.048 mL/g and α=0.55)

n=8.5×10$^{-3}$ mL/mg and MV≈9,200

$^{29}$Si-NMR (80 MHz, CHCl$_3$) revealed: presence of central silicon atoms at −21.9 ppm and of terminal Si atoms at −2.5 ppm, and absence of (OSi—OH) peaks at −11.8 ppm and of

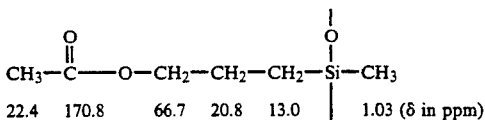

$^{13}$C-NMR (80 MHz, CHCl$_3$) resulted in the following assignment of the peaks:

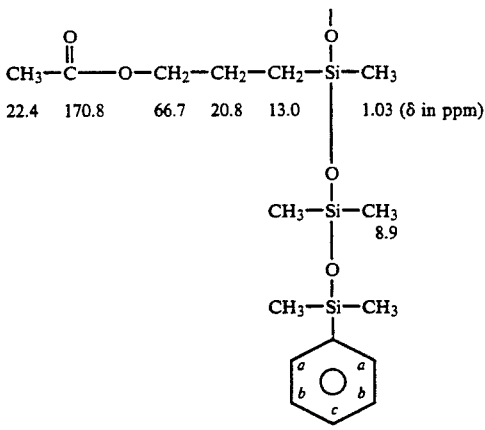

(132, 9 (c); 129.2 (a); 127.7 (b) for the carbon of the aromatic ring).

The hydrolysis of this compound was carried out in the presence of KCN (1 wt %) in methanol at room temperature for 24 hours. The compound was purified by washing with water-ether, then it was dried over Na$_2$SO$_4$, and the solvent was evaporated at low pressure. The product was obtained with a yield of 90%.

The IR results (Perkin Elmer 398) were: disappearance of the vibration band for the

groups (b 1,730 cm$^{-1}$) and appearance of the vibration band for the OH groups at 3,350 cm$^{-1}$.

$^1$H-NMR (250 MHz, CHCl$_3$) result: hydrolysis rate: 95%.

The structure of compound (9) is as follows:

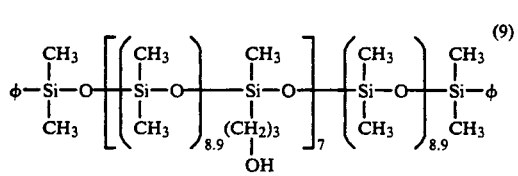

EXAMPLE 2

Preparation of the Polysiloxane which Contains Lateral Urethane-vinyl Ether Groups (11)

Step 1—Synthesis of triethoxysilane-propylurethane vinyl ether (12)

In a 50-mL flask fitted with a cooling coil one introduces:

6 g (EtO)$_3$—Si(CH$_2$)$_3$NCO
2.2 g CH$_2$=CH—O—C$_2$H$_4$OH (7)
0.1 g DBDLT
0.05 g hydroquinone.

The mixture was stirred for 10 min at room temperature. The formation of this product was accompanied by a high release of heat.

Unreacted products were eliminated at reduced pressure. The product yield was more than 95%.

IR analysis of the product (Perkin Elmer 398) revealed the disappearance of the NCO vibration band at 2,260 cm$^{-1}$ and the appearance of the NH band at 3,320 cm$^{-1}$. $^1$H-NMR (250 MHz, CHCl$_3$) result; one quadruplet at 6.4 ppm (O—CH=CH$_2$). $^{13}$C-NMR (Brucker 80 MHz) results: the peaks were assigned as follows to the structural formula (12):

(CH$_3$—CH$_2$—O)$_3$Si—CH$_2$—CH$_2$—CH$_2$—NH—CO—O—
δ in ppm: 17.9   66.4   7.9   25.7   43.5   156.5

CH$_2$—CH$_2$—O—CH=CH$_2$
69.3   62.9   151.7   87.1

Step 2—Polycondensation of triethoxysilane-urethane vinyl ether with polydimethylsiloxanediol in the presence of a chain terminating agent (formation of polysiloxane) (11)

In a 250-mL flask fitted with cooling coil one introduces:

13.6 g triethoxysilane-urethane vinyl ether (12) (0.0406 mol)

32 g dihydroxypolydimethylsiloxane (M=680; % OH=5%; n=8.9, or 0.048 mol), the structure of this commercial product was as follows:

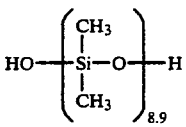

50 mL toluene.

The mixture was stirred for 20 minutes at room temperature. Then 2.3 g of phenyldimethylchlorosilane were added; the mixture was then heated for 90° C. overnight.

Unreacted products were evaporated at reduced pressure (0.005 mm Hg at 140° C.).

44 g of (11) were obtained:

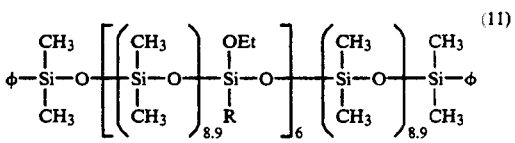

where R=C$_3$H$_6$—NHCOOC$_2$H$_4$OCH=CH$_2$ and φ=—C$_6$H$_5$.

The results of IR analysis (Perkin Elmer 398) were: presence of NH bands (3,320 cm$^{-1}$), and the band for the double bond at 1,620 cm$^{-1}$.

$^{13}$C-NMR (80 MHz, CDCl$_3$) revealed: peaks at 151.5 and 86.9 ppm (—CH=CH$_2$), peaks at 11.3; 23.7 and 43.77 for the carbon atoms at α, β and γ of Si, and the peak at 1.0 ppm for the different carbon atoms attached to the Si atom.

EXAMPLE 3

Polycondensation of Triethoxysilane-urethane Vinyl Ether with 1'α,ω-dihydroxypolydimethylsiloxane Without Chain Terminating Agent (Polysiloxane (13))

In the same apparatus as above one introduces 8.04 g triethoxysilane-urethane vinyl ether (12) and 127 g α,ω-dihydroxypolydimethylsilane ($\overline{M}n$=3,580; % OH=0.95) with the formula HO[(CH$_3$)$_2$SiO]$_{48}$—H, followed by addition of 100 mL of toluene, the mixture is then heated to 80° C. overnight. After elimination of the solvent at reduced pressure, the ether is then diluted, and activated charcoal is added; the entire mixture is then heated to the boiling point for 30 minutes. The mixture is then filtered over Na$_2$SO$_4$ and silica. The ether is evaporated and the product consists of 130 g of viscous compound (13) with the structure:

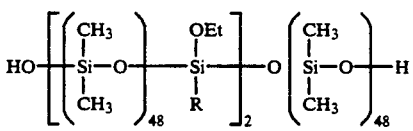

where R=(CH$_2$)$_3$—NHCOOC$_2$H$_4$OCH=CH$_2$

The same IR and $^{13}$C-NMR characteristics were observed as for the product of Example 2, Step 2.

EXAMPLE 4

Preparation of a Polysiloxane which Contains Lateral Thioether-urethane Vinyl Ether Groups (14)

Step 1—Preparation of a polydimethylsiloxane (15) which contains primary hydroxy groups In the 500-mL flask fitted with the cooling coil and a nitrogen inlet one introduces:

100 g of a copolymer of dimethylsiloxane and methylvinylsiloxane ($\eta = 1$ Pa.s; $\%[OSi(CH_3)CH=CH_2] = 7.5\%$, supplied by Petrarch System)

21.7 g thioethanol (MERCK) and 0.6 g AIBN, and 200 mL toluene.

The mixture was heated to 70° C. for 6 hours. Then solvent and unreacted products were eliminated by evaporation at reduced pressure. 118 g of product $e_1$ were obtained.

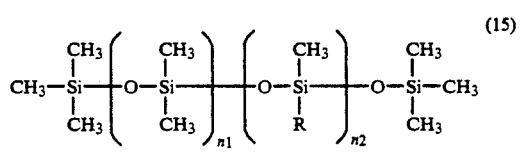
(15)

where
R=CH$_2$CH$_2$—S—CH$_2$CH$_2$OH and
$n_1 = 348$
$n_2 = 25$.

$^1$H-NMR analysis (250 MHz, CDCl$_3$) revealed the complete disappearance of vinyl protons at 6.0 ppm and the appearance of multiplets at 0.9 and 2.6 ppm in $\alpha$ and $\beta$ positions of the Si atom and at 2.7 and 3.6 ppm in the $\alpha$ and $\beta$ positions of the hydroxyl group.

$^{13}$C-NMR (80 MHz, CDCl$_3$) permitted the assignment of the peaks corresponding to group (16) as follows:

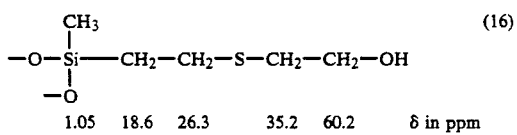
(16)

1.05  18.6  26.3     35.2  60.2      $\delta$ in ppm

The content of OH groups of the product was 1.2%.

Step 2—Polysiloxane (14)

In a 100-mL flask fitted with cooling coil and a nitrogen inlet the following quantities of the following ingredients are introduced:

10 g of product (15) prepared in Step 1, 1.9 g of product (8), 50 mL of anhydrous toluene and 0.1 g hydroquinone.

The mixture was stirred and heated at 60° C. for 6 hours. The reaction mixture was treated as in Example 1, Step ($a_4$). The yield was quantitative.

IR analysis (Perkin-Elmer 398) results:
Disappearance of NCO band at 2,260 cm$^{-1}$
Appearance of NH band at 3,380 cm$^{-1}$
Appearance of vinyl band at 1,620 cm$^{-1}$ The structure of compound (14) was as follows:

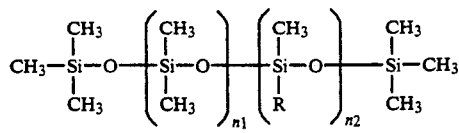

where $n_1 = 348$, $n_2 = 25$ and

R=CH$_2$CH$_2$—S—CH$_2$CH$_2$—OCONHC$_6$H$_3$(CH$_3$)—NHCOO—C$_2$H$_4$—O—CH=CH$_2$

EXAMPLE 5

Preparation of a Polysiloxane which Contains Fluorinated Lateral Groups in the Chain (Product (17))

One introduces into a flask:

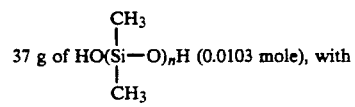

$n = 48$ and % OH = 0.95

2.07 g CH$_2$=CH—O—C$_2$H$_4$—OCONHC$_3$H$_6$Si(OEt)$_3$ (product (11) of Example 2) (0.0062 mol).

1.17 g C$_6$F$_{13}$C$_2$H$_4$OC$_3$H$_6$Si(OEt)$_3$ (0.0021 mol).

The reaction is conducted and treated in the same manner as for product (13).

$^1$H-NMR and $^{13}$C-NMR confirmed the following structure of the polymer (17) obtained:

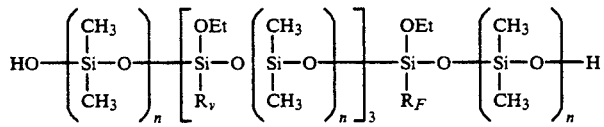

where
$R_v$=C$_3$H$_6$—NHCOOC$_2$H$_4$OCH=CH$_2$
$R_F$=C$_3$H$_6$OC$_2$H$_4$C$_6$F$_{13}$
$n = 48$.

This product is soluble in most organic solvents such as CHCl$_3$, methyl ethyl ketone, CCl$_4$, and acetone. IR analysis revealed the presence of vibration bands for vinyl at 1,620 cm$^{-1}$ and for NH at 3,300 cm$^{-1}$.

EXAMPLE 6

Preparation of a Polysiloxane which Contains Fluorinated Groups in the Chain and at the Ends (18)

In a 250-mL flask fitted with cooling coil, one introduces:

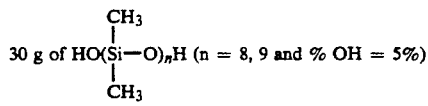

equivalent to 0.044 mol
11.82 g R$_V$Si(OEt)$_3$ (12), or 0.035 mol
7.51 g R$_F$Si(OEt)$_3$, or 0.013 mol, and
0.5 g tetramethylguanidine.

The reaction is conducted and treated in the same manner as for Example 6.

40 g of a viscous product are obtained, which, as shown by the IR spectrum, agrees with the following formula (18):

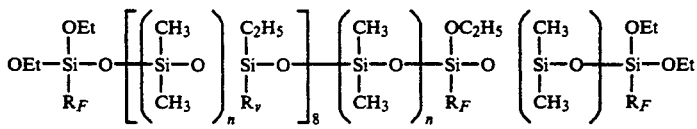

where
$R_F = C_6F_{13}C_2H_4OC_3H_6$
$R_\nu = -C_3H_6NHCOOC_2H_4OCH=CH_2$
$n = 8.9$.
The theoretical $\overline{Mn}$ was approximately 10,500.

EXAMPLE 7

Preparation of a Polysiloxane which Contains Fluorinated Lateral Groups and Lateral and Terminal Urethane-vinyl Ether Groups (19)

Step 1

In the same apparatus as above one introduces:

50 g of $HO(\underset{CH_3}{\underset{|}{\overset{CH_3}{\overset{|}{Si}}}}-O)_nH$ (n = 8.9 and % OH = 5);

$\overline{Mn} = 680$) (0.073 mol),
11.44 g $C_6F_{13}C_2H_4OC_3H_6SiCH_3Cl_2$ (0.022 mol),
9.48 g $AcOC_3H_6SiCl_2CH_3$ (0.0441 mol),
2.86 g $AcOC_3H_6SiCl(CH_3)_2$ (0.0147 mol), and
1 g tetramethylguanadine. The reaction was conducted and treated as above.

The structure of the product obtained was as follows:

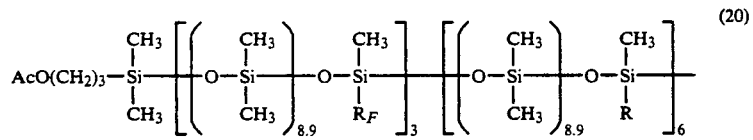

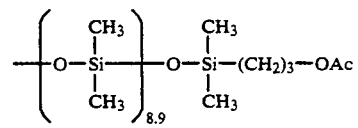

where
$R_F = C_3H_6-O-C_2H_4-C_6F_{13}$ and
$R = C_3H_6-OCOCH_3$

Step 2: hydrolysis of (20) to prepare (21)

The product obtained in the first step is reacted in the presence of 0.4 g KCN in 100 mL $CH_3OH$ (RP) for 24 hours at room temperature.

Step 3: Grafting of ω-isocyanate vinyl ethers 10 g of product (21) are added to 1.96 g of vinyl ether-ω-isocyanate (8) and 60 mL of toluene in a nitrogen atmosphere. The reaction lasted 5 hours at 40° C. A waxy yellowish product (19), which was soluble in butanone, was obtained.

The analysis showed that product (19) agreed with the following formula:

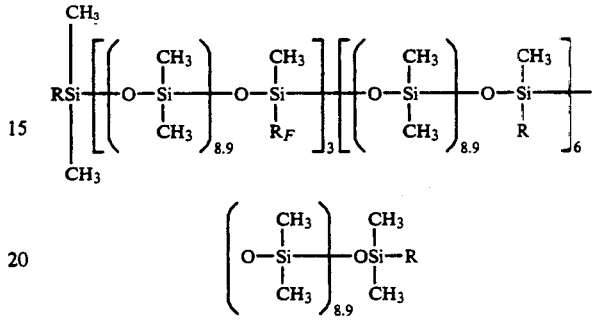

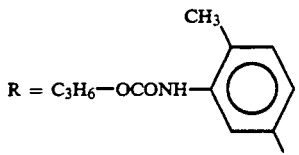

where $R_F = C_3H_6-O-C_2H_4-C_6F_{13}$ and $R = C_3H_6-OCONH-$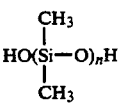$-NH-COOC_2H_4-OCH=CH_2$

EXAMPLE 8

Preparation of the Polysiloxane which Contains Fluorinated Lateral Groups and Urethane-vinyl Ether and which has Dimethylphenylsilane Ends (22)

One reacts: 50 g

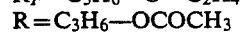
$HO(\underset{CH_3}{\underset{|}{\overset{CH_3}{\overset{|}{Si}}}}-O)_nH$ (n = 8.9) 0.073 mol),
12.5 g $C_6F_{13}C_2H_4OC_3H_6SiCl_2CH_3$ (0.024 mol),
9.3 g $AcOC_3H_6SiCl_2CH_3$ (0.043 mol), and
2.1 g $\phi SiCl(CH_3)_2$ (0.012 mol).

After condensation in the presence of a salt of tetramethylguanadine and hydrolysis in the presence of KCN ($CH_3OH$) one obtains a fluorinated polysiloxane which contains lateral OH groups (23).

One reacts 10 g of this polymer (23) in 20 mL toluene and 1.5 g vinyl ether-ω-isocyanate (8) at 50° C. for 4 hours in nitrogen to obtain a yellowish viscous liquid (22), whose analysis showed that it agreed with the following formula:

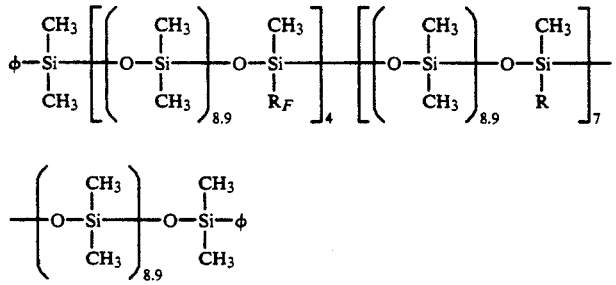

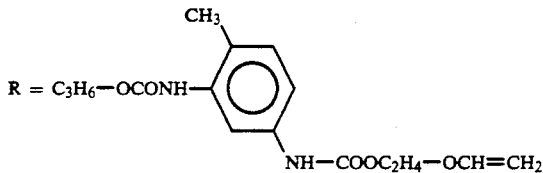

where $R_F = C_3H_6-O-C_2H_4-C_6F_{13}$ and

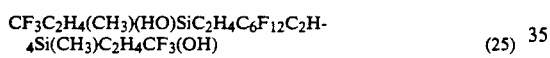

$R = C_3H_6-OCONH-\phi(CH_3)-NH-COOC_2H_4-OCH=CH_2$

EXAMPLE 9

Preparation of a Polysiloxane which Contains Fluorinated Groups in the Chain, Lateral Fluorinated and Urethane-vinyl Ether Groups, and which has Dimethylvinylsilane Ends (24)

The silanediol $$CF_3C_2H_4(CH_3)(HO)SiC_2H_4C_6F_{12}C_2H_4Si(CH_3)C_2H_4CF_3(OH) \quad (25)$$

was prepared according to a method described by Y. Kim in Rubber Chem. Technol. (1971), 1350, by hydrosilylation of $CH_2=CHC_6F_{12}CH=CH_2$ with 3,3,3-trifluoropropylmethylchlorosilane, followed by hydrolysis.

One reacts 12 mol parts of silanediol (25) with 4 mol parts $C_6F_{13}C_2H_4OC_3H_6SiCl_2CH_3$, 7 mol parts $AcOC_3H_6SiCl_2CH_3$, and 2 mol parts $C_6H_5SiCl(CH_3)_2$ as described in Example 8. After hydrolysis of the silicone in the presence of $KCN/CH_3OH$ and reaction with compound (8), as described in Example 8, one obtains a product (24) which had the following structure:

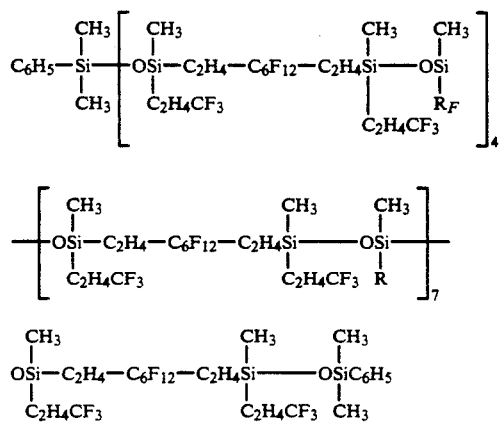

where $R_F$ and $R$ are as described in Example 8.

EXAMPLE 10

Preparation of the Polysiloxane which Contains Lateral Fluorinated Groups and Lateral and Terminal Urethane-vinyl Ether Groups Step 1: One introduces in a 250-mL flask:

15 g of

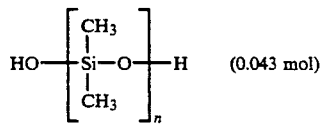
(0.043 mol)

with $n = 4.49$ and % OH = 9.7%, 19.86 g $Cl_2(CH_3)SiC_3H_6OC_2H_4C_8F_{17}$ (0.032 mol) (26), 1.53 g $Cl_2(CH_3)SiC_3H_6OCOCH_3$ (0.0071 mol), 1.384 g $Cl(CH_3)_2SiC_3H_6OCOCH_3$ (0.0071 mol), 0.1 g tetramethylguanidine.

Product (26) was prepared as follows:

from $C_2F_5I$, by telomerization of TFEE at 200° C., one obtains the telomer $C_2F_5(C_2F_4)_3I$ (27) which one separates by distillation from the other telomers. Product (27) was reacted with the $C_2H_4$ at 120° C. in the presence of CuCl/ethanolamine producing $C_8F_{17}C_2H_4I$ which was hydrolyzed with 30% oleum to be converted to $C_8F_{17}C_2H_4OH$ (28). Product (28) was reacted with allyl chloride in the presence of tetrabutylammonium hydroxide and soda (20N). After distillation the product obtained is $C_8F_{17}C_2H_4OCH_2-CH=CH_2$ (29). One reacts product (29) with $HSi(CH_3)Cl_2$ in the presence of $H_2PtCl_6$ (at 50% in isopropanol) in hexane at 70° C. for 24 hours and, after distillation of the solvent, one distills the final product in a vacuum (26).

The polycondensation reaction between

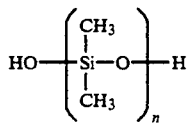

and the precursors mentioned above was conducted at 70° C. for 18 hours while keeping the reaction in a 20 torr vacuum. The product was diluted with ether and filtered, and after evaporation of the solvent in a vacuum, one obtained 34.75 g of very viscous product which contains 31.5 wt % fluorine.

IR analysis has shown the presence of acetate groups (1,740 cm$^{-1}$ region) and also of other units present in the structure (30).

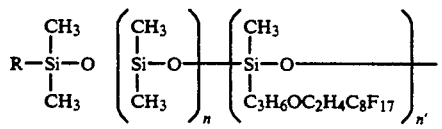

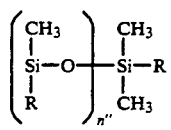

where
n=54; n'=9, n"=2
R=C$_3$H$_6$OCOCH$_3$.

This structure corresponds to the theoretical percentage by weight of fluorine of 29.9% and to a MW=9720.

Step 2

The product (30) was hydrolyzed in the presence of KCN in methanol to prepare a product (31) which presented a total conversion of acetate groups to free hydroxyl groups.

Step 3

Polysiloxane (31) with free, lateral and terminal hydroxyl groups was reacted with vinyl ether-ω-isocyanate (8) to obtain product (32):

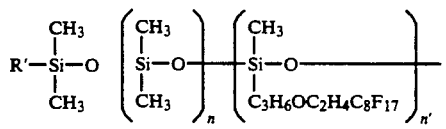

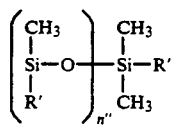

where R'=C$_3$H$_6$OCONHC$_6$H$_3$(CH$_3$) NHCOOC$_2$H$_4$OCH=CH$_2$ and where n, n', and n" are the same as in (30).

EXAMPLE 11

Use of Polymers According to the Invention for the Production of Crosslinked Coatings with Antiadhesive Properties Coating compositions were prepared by dissolving a polymer according to the invention, and a photosensitive catalyst in a solvent in the proportions indicated in the table below, and these compositions were applied to kraft paper using a manual applicator consisting of a threaded rod, in quantities indicated in said table (in g/m$^2$). The applied coat was crosslinked by exposure to a UV lamp (80 W/cm$^2$) for the time indicated in the table. In all cases a paper with antiadhesive properties was obtained from which adhesive ribbons could be removed easily. In addition, there was no trace of migration, from the antiadhesive film of the silicon polymer of the invention to the adhesive ribbon, because the latter remained capable of adhering to itself. These antiadhesive properties were preserved even after storage for 24 hours of the treated papers in an oven at 60° C.

TABLE

| Composition | Polymer Type | Polymer Quantity, g | Solvent Type | Solvent Quantity, g | Catalyst Type | Catalyst Quantity, g | Weight of Coating g/m$^2$ | Time of Exposure to UV, sec |
|---|---|---|---|---|---|---|---|---|
| A | (10) (Ex. 1) | 1 | MEK | 1 | φ$_3$S$^+$SbF$^-_6$ | 0.05 | 8.8 | 3 |
| B | (10) (Ex. 1) | 0.5 | CHCl$_3$ | 0.7 | φ$_3$S$^+$SbF$^-_6$ | 0.04 | 4.3 | 3 |
| C | (11) (Ex. 2) | 1.85 | — | — | φ$_3$S$^+$SbF$^-_6$ | 0.07 | 15 | 5 |
| D | (13) (Ex. 3) | 2.2 | — | — | φ$_3$S$^+$SbF$^-_6$ | 0.15 | 14 | 5 |
| E | (17) (Ex. 5) | 2 | MEK | 0.4 | φ$_3$S$^+$SbF$^-_6$ | 0.06 | 12 | 3 |

The invention claimed is:

1. A siloxane copolymer having a molecular weight from 5,000 to 100,000 and represented by formula I:

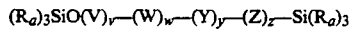

$(R_a)_3SiO(V)_v$—$(W)_w$—$(Y)_y$—$(Z)_z$—$Si(R_a)_3$ where
V=—SiR$_a$R$_b$O—;
W=—SiR'$_a$(R$_c$—R$_d$—OCH=CH$_2$) O—;
Y=—SiR$_a$R$_g$O—;
Z=—R$_a$R$_g$SiC$_n$H$_{2n}$R'$_f$C$_n$H$_{2n}$SiR$_a$R$_g$O—with n=2, 3 or 4;
v, y, z are identical or different numbers, but they cannot be simultaneously zero; w is always different from zero; and the ratio v+y+z/w is between 1 and 100; the groups R$_a$ represent, independently of each other, a radical selected from the group consisting of CH$_3$, C$_2$H$_5$, n-C$_3$H$_7$, n-C$_4$H$_{10}$ radicals, and phenyl, with not more than one phenyl radical being attached to a given silicon atom;
R$_b$=R$_a$;
R'$_a$=R$_a$, —OCH$_3$ or OC$_2$H$_5$
R$_c$=C$_2$H$_4$—, —C$_3$H$_6$—, —C$_2$H$_4$—S—C$_2$H$_4$—, or —C$_3$H$_6$—S—C$_2$H$_4$—;
R$_d$=—OCONHR$_e$NHCO—, —NH—COOC$_2$H$_4$—, or —NHCOOC$_3$H$_6$—;
R$_e$=—C$_6$H$_3$(CH$_3$)—, —C$_6$H$_4$CH$_2$C$_6$H$_4$—, —(CH$_2$)$_6$—, —C$_6$H$_{10}$—CH$_2$—C$_6$H$_{10}$—, or —CH$_2$—[(CH$_3$)$_3$C$_6$H$_7$]—;
R$_g$=—C$_k$H$_{2k}$—R$_f$ where k=2, 3 or 4;
R$_f$ is a perfluoroalkyl group with 1 to 12 carbon atoms, or a monovalent radical of an oligomer of oxetanes or fluorinated oxiranes;
R'$_f$ is a perfluoroalkylene group with 4 to 10 carbon atoms, or an alpha,omega-fluoroalkenyl group formed by telomerization of tetrafluoroethylene, or a telechelic divalent radical of an oligomer derived from fluorinated oxetanes or oxiranes, or an m-phenylenedi(hexafluoroisopropoxy) radical; and the units V, W, Y and Z can be arranged randomly, in order or alternated along the polymer chain.

2. Copolymer according to claim 1, represented by the formula:

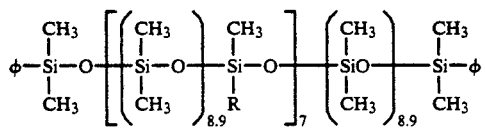

where R=—$C_3H_6$—O—CONH—$C_6H_4(CH_3)$NH-COO$C_2H_4$OCH=$CH_2$ and $\phi$=—$C_6H_5$ 3. Copolymer according to claim 1 represented by the formula:

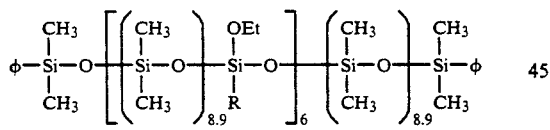

where R=—$C_3H_6$—NHCOO$C_2H_4$OCH=$CH_2$ and $\phi$=—$C_6H_5$

4. Copolymer according to claim 1 represented by the formula:

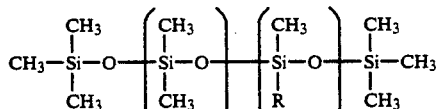

where
$n_1 = 348$,
$n_2 = 25$ and
R=$CH_2CH_2$—S—$CH_2CH_2$OCONH$C_6H_3(CH_3)$—NHCOO—$C_2H_4$—O—CH=$CH_2$.

5. Copolymer according to claim 1 represented by the formula:

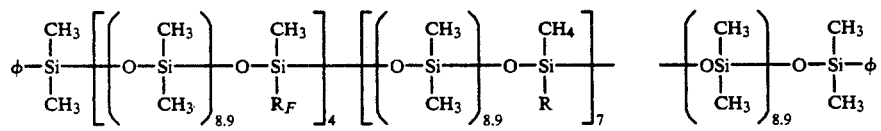

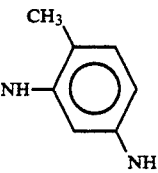

where $R_F = C_3H_6$—O—$C_2H_4C_6F_{13}$, and R = $C_3H_6$OCONH—[phenyl with CH$_3$ and NH—COO$C_2H_4$—OCH=$CH_2$]

6. Copolymer according to claim 1 represented by the formula:

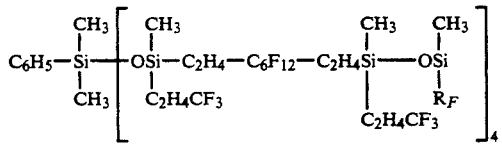

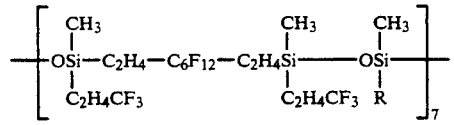

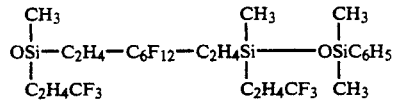

where R and $R_F$ are as defined in claim 5.

* * * * *